United States Patent [19]
Solomon et al.

[11] Patent Number: 5,682,795
[45] Date of Patent: Nov. 4, 1997

[54] ROBOTIC JOINT USING METAL BANDS

[75] Inventors: Todd R. Solomon, Los Gatos, Calif.; Alexander H. Slocum, Bow, N.H.

[73] Assignee: Smart Machines, San Jose, Calif.

[21] Appl. No.: 500,429

[22] Filed: Jul. 10, 1995

[51] Int. Cl.$^6$ ............................................ G05G 23/00
[52] U.S. Cl. .................. 74/490.04; 403/387; 403/393; 474/270; 474/271
[58] Field of Search ............................... 474/270, 271, 474/264, 268, 201, 202, 204; 74/490.04, 490.01, 89.22; 403/393, 388, 387; 901/21, 23; 185/45

[56] References Cited

U.S. PATENT DOCUMENTS

| | | | |
|---|---|---|---|
| 208,432 | 9/1878 | Spadone | 474/270 |
| 219,531 | 9/1879 | Sharp | 474/270 |
| 420,779 | 2/1890 | Emery | 474/270 |
| 4,022,071 | 5/1977 | Abatemarco | 474/270 |
| 5,161,424 | 11/1992 | Saberton et al. | 74/89.22 |
| 5,271,292 | 12/1993 | Sawada et al. | 74/490.04 |
| 5,333,986 | 8/1994 | Mizukami et al. | 74/490.04 |

Primary Examiner—Charles A. Marmor
Assistant Examiner—David M. Fenstermacher
Attorney, Agent, or Firm—Fish & Richardson, P.C.

[57] ABSTRACT

A robotic arm utilizing two pulleys connected by two metal drive bands wound in opposite directions and rotatably attached to the pulleys. The metal drive bands may include multiple metal strips separated by a visco-elastic material. One end of one drive band is attached to the pulley by a pin. The pin has a laterally movable retaining piece with a slanted face having an attachment point connected to one end of the metal band, a vertically movable wedge piece with a face abutting the slanted face, and an adjustment piece which attaches the wedge piece to the pulley and moves the wedge piece vertically.

8 Claims, 4 Drawing Sheets

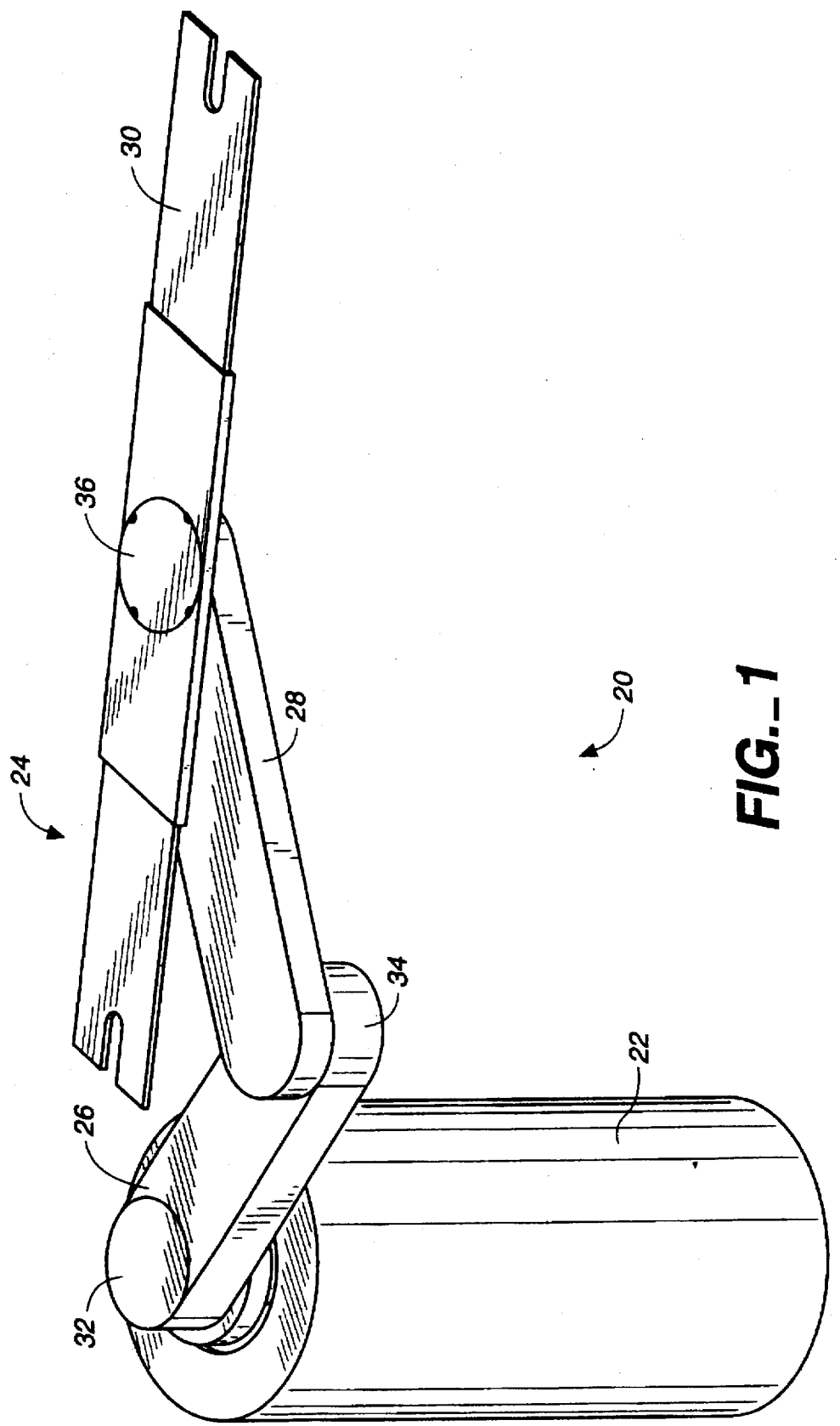

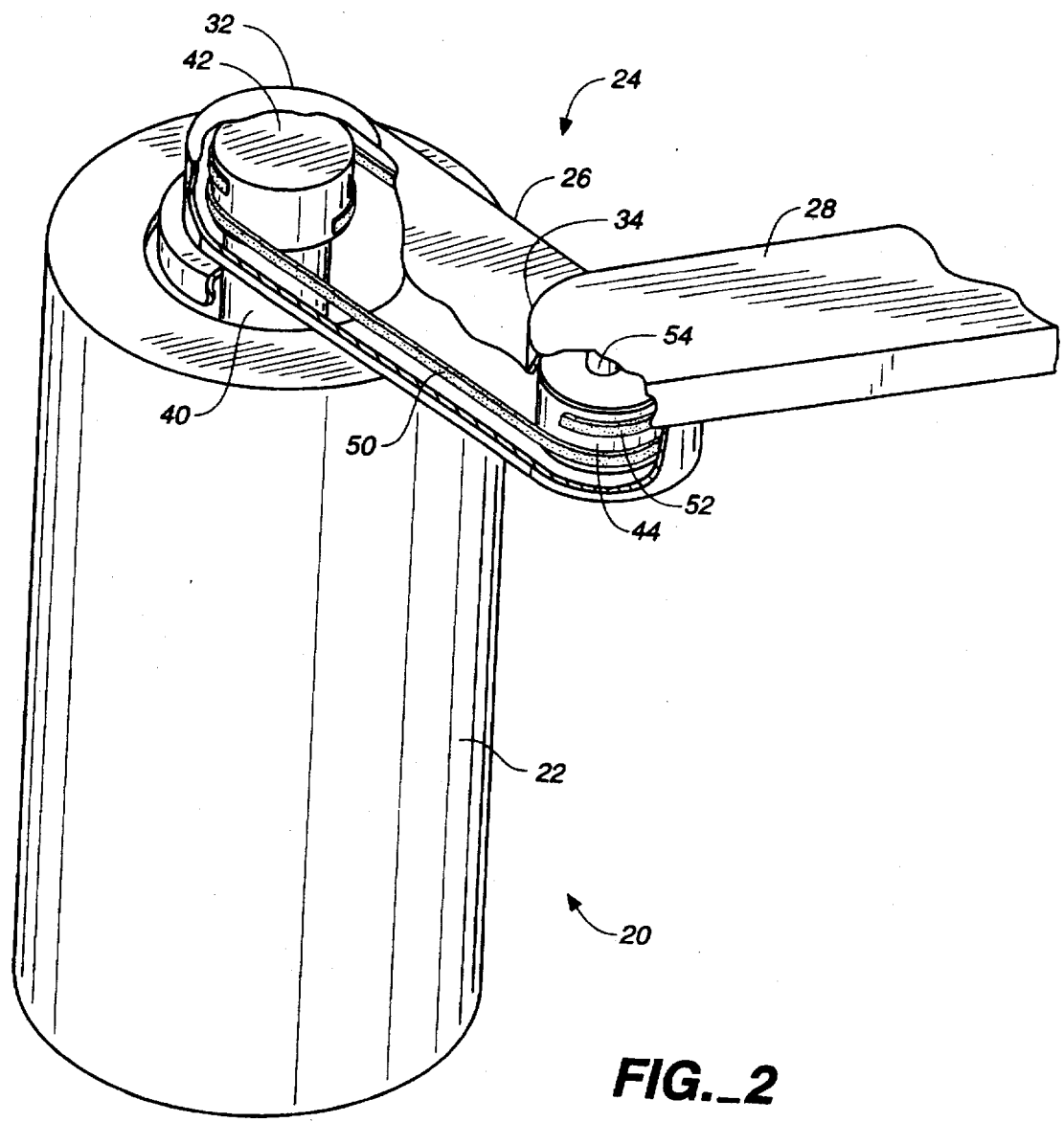
FIG._2

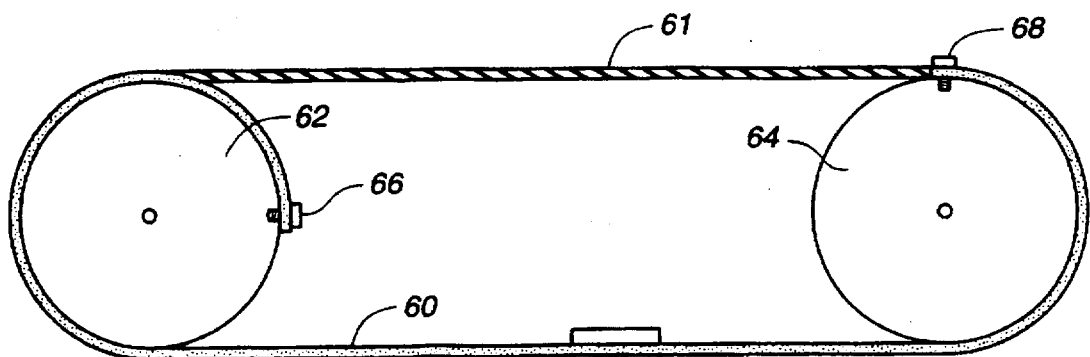
FIG._3A
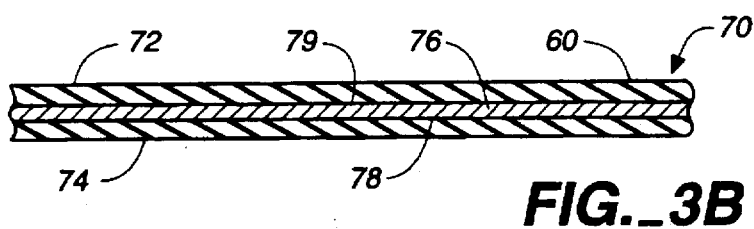
FIG._3B
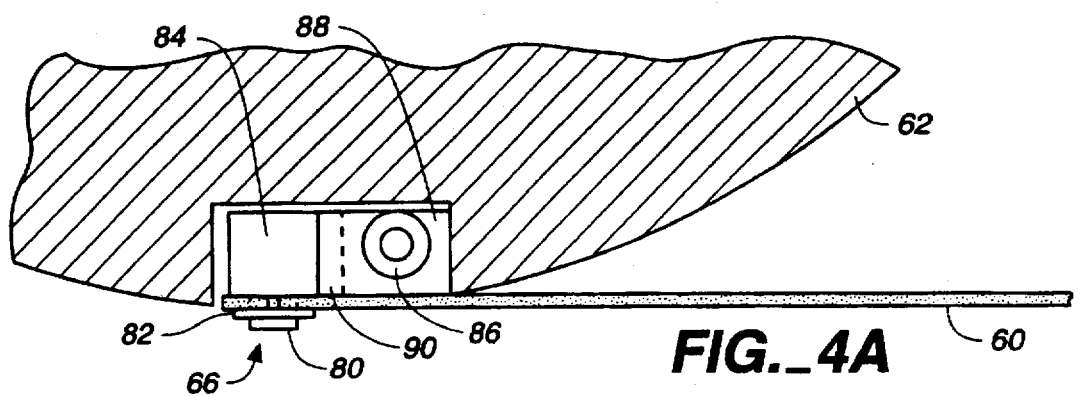
FIG._4A
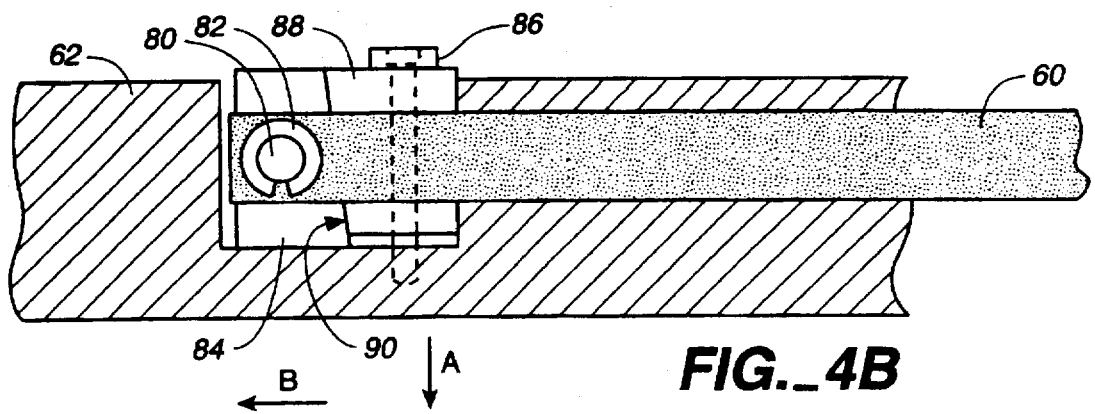
FIG._4B

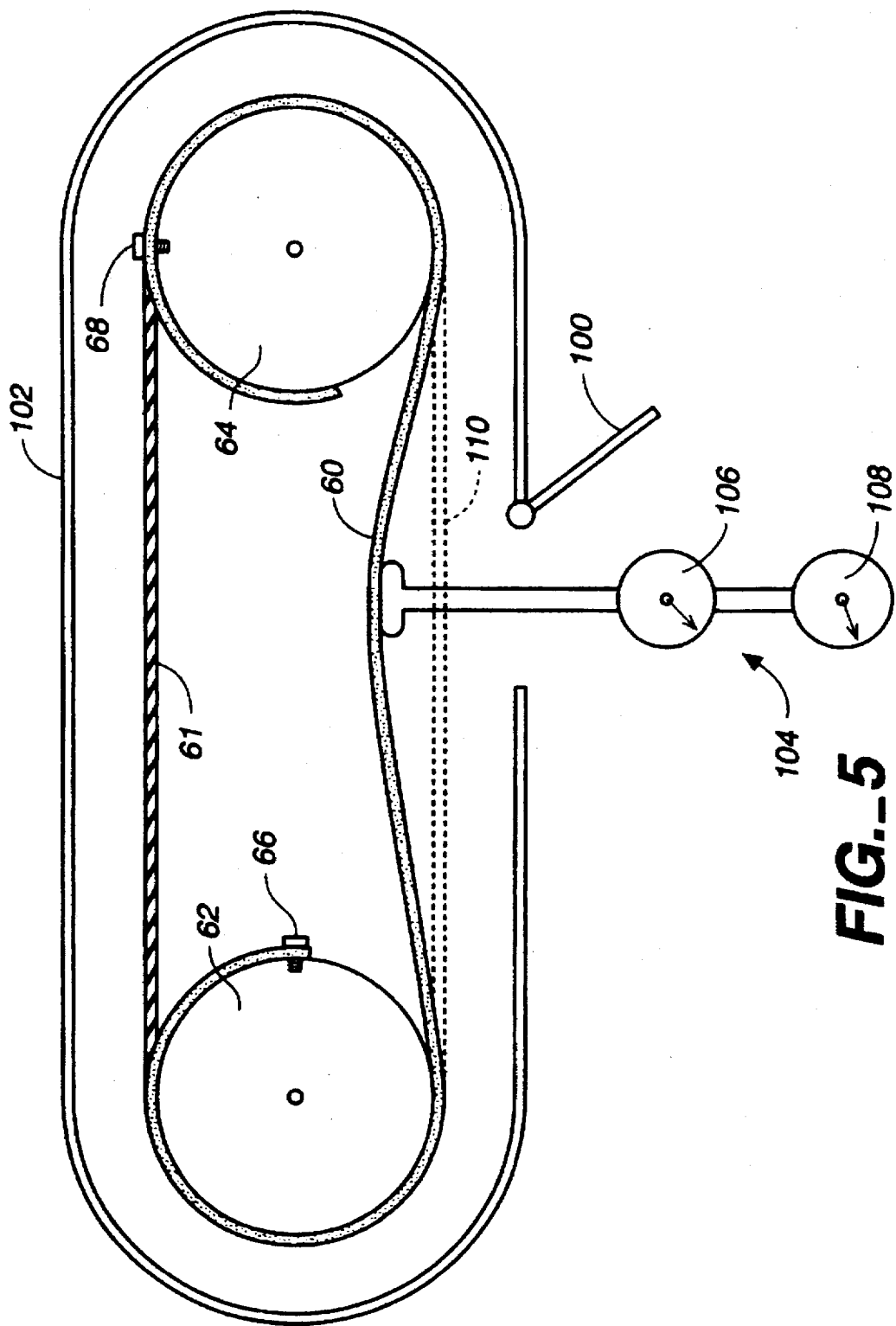
FIG._5

ROBOTIC JOINT USING METAL BANDS

CROSS REFERENCE TO RELATED APPLICATIONS

Reference is made to concurrently filed applications Ser. No. 08/500,124, filed Jul. 10, 1995, entitled DIRECT DRIVEN ROBOT, attorney docket number 07154/004001, and Ser. No. 08/500,428, filed Jul. 10, 1995, entitled ROTARY LABYRINTH SEAL, attorney docket number 07154/005001, assigned to the assignee of the present application, each of which is hereby incorporated by reference.

BACKGROUND OF THE INVENTION

The present invention relates generally to a robotic arm using two metal drive bands to connect two pulleys, and particularly to two metal drive bands with each end attached to a pulley.

Material handling robots are used in automated manufacturing of integrated circuits, flat panel displays, and other precision-made products. Many of these products require near-sterile handling of extremely fragile and expensive materials, such as semiconductor wafers, during the manufacturing process. In semiconductor manufacturing, raw materials and in-process workpieces must be kept extremely clean; the circuit paths etched on the workpieces are so small (e.g., 0.18–10 microns) that minute particles can contaminate the paths and render the finished circuit inoperative. Therefore, sealed, ultra-clean robots are used to move the materials accurately, gently, and precisely, within a clean room, preventing contamination or damage to the materials which could occur through human contact or handling. However, such robots must not generate particles of metal, leak chemicals, or produce other materials which could contaminate a wafer or other substrate.

Further, robots must move precisely to specific points in space to carry out various manufacturing steps. Because wafers, flat panels, and other substrates are extremely fragile and expensive, all robot movements must be gentle and precise. "Backlash," or play in the mechanical components of the robot, must be minimized to ensure accurate movement and to prevent damage to an object on the robot.

In addition, some manufacturing processes are carried out in a vacuum, or require hazardous chemicals. Robots must be vacuum-compatible, and able to handle materials in vacuum and corrosive environments which are hostile to humans.

In many manufacturing applications a robotic arm is used to manipulate articles in an ultraclean room or vacuum chamber. For example, a robotic arm might carry silicon substrates in a chemical vapor deposition chamber. The robot arm must move smoothly, quickly, and predictably; the wafer, for example, would be ruined if the arm dropped it or smashed it into a chamber wall.

A typical robotic arm is constructed to mimic a human arm, and has three joints: shoulder, elbow and wrist. The robotic arm usually includes three motors to control the rotation of the three joints. If the motors are not located in the joints themselves, then there must be drive systems to connect the motors to the joints. For example, a motor may be located in a base of a robot to control the rotation of the elbow joint. Often the drive system includes one pulley attached to a drive shaft from the motor, another pulley at the joint, and a drive belt connecting the two pulleys.

Typically, the pulleys are connected by a continuous elastic drive belt which wraps around both pulleys. The pulleys may also be connected by a continuous timing belt with teeth that engage mating teeth on the pulleys. The elastic drive belt may be a stiff polymer or rubber. Unfortunately, such drive belts have a short lifetime and are subject to fatigue. In a vacuum, the rubber drive belt may become brittle and can contaminate the environment by outgassing.

The elastic material can stretch, causing inaccuracy of the driven pulley. Stretching also reduces the tension in the drive belt, causing the continuous drive belt to slip, making the robotic arm stutter and jerk. A timing belt does not lose timing, but the accuracy of the timing suffers due to the stretching. In addition, timing belts are subject to backlash from the clearance between teeth on the pulley and drive belt.

If the driving pulley comes to a sudden stop, the other pulley may continue to rotate, stretching the elastic drive band. Then the other pulley may rotate backwards to relax, or even compress, the drive band.

These effects are unacceptable because they make the position of the arm uncertain and require the arm to move more slowly. For example, if the robotic arm is carrying substrates in a deposition chamber, then the throughput of the chamber is reduced because the arm cannot move quickly. In addition, these effects increase the likelihood of accidental damage to the manipulated article or chamber. For example, the arm might smash into the silicon substrate, rather than sliding under the substrate to lift it out of the deposition chamber.

Maintaining the proper tension in a drive belt can be difficult. In general, for a circular drive belt, the only ways to increase the tension is to move the pulleys farther apart, add an adjustable idler pulley, or to replace the drive belt. A drive system in which the pulleys do not need to move would be less expensive.

In view of the foregoing, it is an object of the present invention to provide a robotic arm having a drive band which has a long lifetime and little fatigue.

It is another object of the invention to provide a robotic arm with a drive system that provides perfect timing without backlash.

It is yet another object of the invention to provide a robotic arm with a mechanism to adjust the tension of the drive band without changing the position of the pulleys.

SUMMARY OF THE INVENTION

The present invention is directed to a robotic arm utilizing a first pulley located at a first joint of the robotic arm, a second pulley located at a second joint of the robotic arm, and opposing first and second metal drive bands each with one end rotatably attached to the first pulley and a another end rotatably attached to the second pulley. The metal drive band may include multiple metal strips separated by a visco-elastic material. A second metal drive band, attached at both ends to the first and second pulleys, may wrap around the pulleys in the opposite direction as the first drive band.

The present invention is also directed to a robotic arm in which a pulley is located at a joint of a robotic arm and a metal band is attached to the pulley by a pin. The pin includes a laterally movable retaining piece with a slanted face having an attachment point connected to one end of the metal band, a vertically movable wedge piece with a face abutting the slanted face, and an adjustment piece which attaches the wedge piece to the pulley and moves the wedge piece vertically.

BRIEF DESCRIPTION OF THE DRAWINGS

FIG. 1 is a schematic perspective view of a robot arm.

FIG. 2 is a schematic perspective view of a cut-away robot arm.

FIG. 3A is a schematic top-view of two pulleys connected by a drive band.

FIG. 3B is an expanded view of the drive band of FIG. 3A.

FIG. 4A is a schematic top view of the connection of a drive band to a pulley.

FIG. 4B is a schematic side view of the connection of a drive band to a pulley.

FIG. 5 is a schematic top-view illustrating a method of measuring the tension in a drive band.

DESCRIPTION OF THE PREFERRED EMBODIMENTS

As shown in FIG. 1, a robot 20 is constructed to mimic the lateral freedom of motion of a human arm. Robot 20 has a base 22 and a movable arm 24. The movable arm 24 includes an upper arm 26, a forearm 28, and a hand 30. Upper arm 26 is connected to base 22 at a rotatable shoulder 32, forearm 28 is connected to upper arm 26 by a rotatable elbow 34, and hand 30 is connected to forearm 28 by a wrist 36.

Base 22 contains motors (not shown) to drive several rotatable shafts (not shown). A first rotatable shaft is connected directly to upper arm 26 and controls the rotation of shoulder 32. A second rotatable shaft is connected by pulleys and a drive band to forearm 34 and controls the rotation of elbow 34. The first shaft may be disposed concentrically around the first shaft.

As shown in FIG. 2, base 22 contains a motor to drive a rotatable shaft 40. Shaft 40 is connected to a shoulder pulley 42 located in shoulder 32. An elbow pulley 44 is located in elbow 34. Shoulder pulley 42 is connected to elbow pulley by a drive band 50 which passes through upper arm 26. In the preferred embodiment, drive band 50 does not form a continuous circular belt around the pulleys. Instead, one end of band 50 is attached to a spot on shoulder pulley 42 and the other end of band 50 is attached to a spot on elbow pulley 34.

A second drive band 52 is attached at its ends to shoulder pulley 42 and elbow pulley 44. However, second drive band 52 is wrapped around pulleys 42 and 44 in an opposite manner to drive band 50. This configuration places both drive bands in constant tension so that neither drive band ever goes slack. Elbow pulley 44 may be attached by a shaft 54 to forearm 28.

As shown in FIG. 3A, a drive band 60 is pinned to pulleys 62 and 64 by pins 66 and 68, respectively. The ends of drive band 60 are wrapped in clockwise manner around both pulleys 62 and 64. In this configuration, neither pulley can rotate the full 360° because otherwise drive band 60 will overwrap pin 66 or 68. In practice, pulleys 62 and 64 cannot rotate more than 320°–330°. In an application, such as a robotic arm which does not need a full range of motion, this attachment configuration is preferred because it has no slipping, and thus perfect timing. The timing is guaranteed to be accurate because the ends of drive band 60 are pinned in place to prevent slipping.

An opposing drive band 61 may be similarly attached to pulleys 62 and 64, but wound around the pulleys in the opposite direction. Drive bands 60 and 61 could be a single belt attached at two points to the pulleys 62 and 64, but this would further limit the freedom of rotation of the robotic arm.

In one embodiment, drive band 60 is a metal strip, three-thousandths to ten-thousandths of an inch thick and an eighth of an inch to a few inches wide. Preferably, drive band 60 is stainless steel. A metal band has little stretch, low fatigue, high predictability, and a long lifetime, all of which give superior reliability. Drive band 60 may be permanently pretensioned. A stainless steel band is vacuum compatible. In this embodiment, the pulleys may be different sizes (see FIG. 2).

In another embodiment, shown in expanded view 70 of FIG. 3B, drive band 60 includes two metal strips 72 and 74 separated by an visco-elastic material 76. By using two metal strips, the stiffness of drive band 60 is effectively doubled. However, if the two metal strips are directly adjacent, they will slide against each other and abrade each time drive band 60 is wrapped around pulley 62 or 64. A visco-elastic material 76, such as a soft elastic rubber, is placed between metal strips 72 and 74 to act as a buffer. Visco-elastic material 76 allows strips 72 and 74 to move relative to each other a small amount without friction or abrasion. In addition, visco-elastic material 76 may dampen out any vibration in drive band 60. If multiple metal strips are used, then preferably pulleys 60 and 62 are the same diameter.

Visco-elastic material 76 may be about half a mil (thousandth of an inch) to several mils thick. In one embodiment, visco-elastic material 76 is bonded to metal strips 72 and 74 by thin adhesive layers 78 and 79. Adhesive layers 78 and 79 may be some sort of elastomeric material. In another embodiment, visco-elastic material 76 is held between metal strips 72 and 74 simply by the tension in drive band 60.

As shown in FIGS. 4A and 4B, the end of drive band 60 is rotatably attached to pulley 62 by pin 66. In particular, the end of drive band 60 has a hole, and a spoke 80 projects through the hole. A retaining spring clip 82, in the form of a slotted washer, prevents drive band 60 from slipping off spoke 80. Because the hole in drive band 60 is slightly larger than spoke 80 and retaining clip 82 does not hold drive band 60 tightly, drive band 60 is free to rotate around spike 80. This attachment equalizes the stress across the cross-section of drive band 60 and thereby increase the lifetime of the drive band. If drive band 60 was fixedly attached to pulley 62, then if pulley 62 rotated slightly relative to drive band 60, one edge of drive band would be in tension and the other edge would be slack. Consequently, only part of drive band 60 would carry the load, and the drive band would stretch and soften.

Pulley 62 has a mechanism to adjust the position of pin 66 and thereby adjust the tension on drive band 60. A screw 86 passes through and holds a tightening wedge 88. One face of tightening wedge 88 engages a diagonal face 90 of a base 84. To increase the tension in band 60, screw 86 is tightened, pushing tightening wedge 88 down in the direction of arrow A. This pushes against diagonal surface 90, thereby forcing base 84 to slide outward in the direction of arrow B. Conversely, to decrease the tension in drive band 60, screw 86 is loosened. The range of lateral adjustment of base 84 is about one-tenth of an inch. Base 84 is positioned so that band 60 is kept at a tension up to several hundred pounds. Drive band is rotatably attached at both ends to pulleys 62 and 64. However, the attachment point at only one end of only one of the drive bands needs to moved to adjust the tension in the both drive bands.

As shown in FIG. 5, to measure the tension of band 60, an access port 100 in the arm 102 (sometimes called a "tub")

containing pulleys 62 and 64 is opened. An instrument 104 is inserted to press on band 60. Instrument 104 may have a force gage 106 to measure the force applied to band 60, and a deflection gage 108 to measure the deflection of band 60 from its undeflected path 110. Then tension of band 60 is calculated from the measurements of the applied force and deflection.

Other implementations are contemplated and are within the scope of the invention.

What is claimed is:

1. A robotic arm, comprising:

a pulley located at a joint of said robotic arm;

a metallic band; and a positioning mechanism attaching said metallic band to said pulley, said positioning mechanism including i) a laterally movable retaining piece having an attachment point connected to one end of said metallic band, said retaining piece having a slanted face, ii) a vertically movable wedge piece having a face abutting said slanted face, and iii) an adjustment piece to attach said wedge piece to said pulley and to move said wedge piece vertically.

2. The robotic arm of claim 1 wherein said metal band includes an aperture at one end of said band, and said retaining piece includes a projection which fits through said aperture.

3. The robotic arm of claim 2 wherein said adjustment piece is a screw.

4. A robotic arm comprising:

a first pulley located at a first joint of said robotic arm and having a first cylindrical surface;

a second pulley located at a second joint of said robotic arm and having a second cylindrical surface; and a metallic drive band, said drive band having one end pivotally attached to said first pulley at a first attachment point and free to pivot about a first axis normal to the first cylindrical surface, said first axis passing through said first attachment point, said drive band having another end pivotally attached to said second pulley at a second attachment point and free to pivot about a second axis normal to the second cylindrical surface, said second axis passing through said second attachment point.

5. The robotic arm of claim 4 wherein said drive band includes a laminar stack of a plurality of parallel metallic strips.

6. The robotic arm of claim 5 wherein said laminar stack includes a layer of visco-elastic material which separates said parallel metallic strips.

7. The robotic arm of claim 4 wherein said drive band includes an aperture at one end thereof, and said pulley includes a projection which fits through said aperture.

8. The robotic arm of claim 7 further including a retaining clip to hold said drive band on said projection.

* * * * *